(12) United States Patent
Kraus et al.

(10) Patent No.: US 9,995,950 B2
(45) Date of Patent: Jun. 12, 2018

(54) SPECTACLE LENS FOR CAR DRIVERS

(71) Applicant: Carl Zeiss Vision International GmbH, Aalen (DE)

(72) Inventors: Stefan Kraus, Aalen (DE); Bernhard von Blanckenhagen, Aalen (DE); Frank Mielich, Kirchheim (DE)

(73) Assignee: Carl Zeiss Vision International GmbH, Aalen (DE)

(*) Notice: Subject to any disclaimer, the term of this patent is extended or adjusted under 35 U.S.C. 154(b) by 1 day.

(21) Appl. No.: 15/011,297

(22) Filed: Jan. 29, 2016

(65) Prior Publication Data

US 2017/0219848 A1    Aug. 3, 2017

(51) Int. Cl.
G02C 7/10    (2006.01)
G02B 27/00   (2006.01)

(52) U.S. Cl.
CPC ......... *G02C 7/107* (2013.01); *G02B 27/0012* (2013.01); *G02C 7/10* (2013.01); *G02C 7/104* (2013.01); *G02C 2202/16* (2013.01)

(58) Field of Classification Search
CPC .......... G02C 7/10; G02C 7/104; G02C 7/107; G02C 2202/16; G02B 27/01; G02B 27/101; G02B 27/0149; G02B 27/017; G02B 27/0172; G02B 27/0176; G02B 27/0179
USPC ............ 351/159.01, 159.59, 159.61, 159.62, 351/159.65, 159.66, 159.74–159.77, 178
See application file for complete search history.

(56) References Cited

U.S. PATENT DOCUMENTS

| 4,247,177 A | 1/1981 | Marks et al. |
| 5,147,125 A | 9/1992 | Austin |
| 5,470,932 A | 11/1995 | Jinkerson |

(Continued)

FOREIGN PATENT DOCUMENTS

| JP | 7-306387 A | 11/1995 |
| JP | 9-281317 A | 10/1997 |

(Continued)

OTHER PUBLICATIONS

Ernest, Paul, "Light-transmission-spectrum comparison of foldable intraocular lenses", J Cataract Refract Surg—vol. 30, Aug. 2004, Elsevier, Inc., pp. 1755-1758.

(Continued)

*Primary Examiner* — Stephone B Allen
*Assistant Examiner* — Travis Fissel
(74) *Attorney, Agent, or Firm* — Ewers & Hasselmann PLLC (57) ABSTRACT

A spectacle lens having a front surface intended to be fitted away from the eye. The spectacle lens includes a substrate made from mineral glass or an organic material. The spectacle lens has selective light wavelength filter properties. The selective light wavelength filter properties include a spectral transmittance between 80% and 95% for all wavelengths in a wavelength range between 428 nm and 452 nm for a light ray entering the spectacle lens on the front surface at an angle of incidence of 0°, a spectral transmittance between 95% and 100% for all wavelengths in a wavelength range between 500 nm and 700 nm for a light ray entering the spectacle lens on the front surface with an angle of incidence of 0° and a yellowness index of no more than 10 for a standard illuminant D65 and a standard observer function of 2° (D65/2°).

20 Claims, 5 Drawing Sheets

(56) References Cited

U.S. PATENT DOCUMENTS

| | | | |
|---|---|---|---|
| 5,729,379 A | 3/1998 | Allemand et al. | |
| 5,851,674 A * | 12/1998 | Pellerite | B82Y 30/00 |
| | | | 204/192.26 |
| 5,949,518 A | 9/1999 | Belmares et al. | |
| 5,952,096 A | 9/1999 | Yamashita et al. | |
| 6,367,928 B1 | 4/2002 | Buazza et al. | |
| 6,793,339 B1 | 9/2004 | Yip et al. | |
| 6,852,406 B2 | 2/2005 | Marechal et al. | |
| 8,425,035 B2 | 4/2013 | von Blanckenhagen | |
| 8,591,026 B2 | 11/2013 | Conte et al. | |
| 9,057,887 B1 | 6/2015 | Jaglan | |
| 2003/0059616 A1 | 3/2003 | Hartley et al. | |
| 2003/0076474 A1 | 4/2003 | Wang et al. | |
| 2003/0193643 A1 | 10/2003 | Pratt | |
| 2004/0070726 A1 | 4/2004 | Ishak | |
| 2005/0018131 A1 | 1/2005 | Ishak | |
| 2005/0243272 A1 | 11/2005 | Mainster et al. | |
| 2006/0239902 A1 * | 10/2006 | Kimura | C01B 13/32 |
| | | | 423/594.17 |
| 2007/0091251 A1 * | 4/2007 | Anthony | G02C 7/105 |
| | | | 351/44 |
| 2007/0216861 A1 | 9/2007 | Ishak et al. | |
| 2008/0018853 A1 | 1/2008 | Jethmalani et al. | |
| 2010/0066974 A1 * | 3/2010 | Croft | G02C 7/14 |
| | | | 351/159.65 |
| 2013/0250235 A1 * | 9/2013 | Foulds | G02C 7/104 |
| | | | 351/159.65 |
| 2015/0238308 A1 * | 8/2015 | Ishak | G02C 7/04 |
| | | | 623/5.16 |
| 2016/0077361 A1 * | 3/2016 | Wold | A61B 3/066 |
| | | | 351/44 |

FOREIGN PATENT DOCUMENTS

| | | |
|---|---|---|
| JP | 2003-105227 A | 4/2003 |
| JP | 2005-247949 A | 9/2005 |
| WO | 01/77717 A1 | 10/2001 |

OTHER PUBLICATIONS

Mainster, Martin, "Intraocular Lenses Should Block UV Radiation and Violet but Not Blue Light", Arch Ophthalmol., Apr. 1, 2005, vol. 123, No. 4, first page preview and first page.
Translation of Website of Company Takaba Glasses, copyright 2001, "Low Vision Tokai Optical CCP400", three pages.
Hunter Lab, "Yellowness Indices", Applications Note, Insight on Color, vol. 8, No. 15, copyright 2008, pp. 1 and 2.
Wyszecki, G. et al, "Color Science: Concepts and Methods, Quantitative Data and Formulae, 2nd Edition", copyright 1982, Aug. 2000, Wiley Classics Library, ISBN 978-0-471-39918-6, pp. 71, 95 and 106.

\* cited by examiner

SPECTACLE LENS FOR CAR DRIVERS

FIELD OF THE INVENTION

The invention relates to a spectacle lens in particular for car drivers and to a method for production of a spectacle lens in particular for car drivers.

BACKGROUND OF THE INVENTION

Spectacle lenses can be corrective or non-corrective; spectacle lenses can also be prescription or non-prescription. The spectacle lenses can be made for use in clear eyeglasses or tinted eyeglasses (for example, sunglasses). Spectacle lenses may include variable power across their surface area. In particular, such spectacle lenses are, for example, known as bifocals, progressives et cetera.

The range of spectacle lenses offered has become ever greater and more varied in recent years. New materials, production methods, coating and finishing processes enable the manufacturer to offer spectacle lens products that are tailored even more to the individual needs of the customer.

In the past, the base materials or the materials of the substrate spectacle lenses were predominantly made from mineral glasses, in particular crown glasses (Abbe dispersion number>55) and flint glasses (Abbe dispersion number<50). In the meantime, spectacle lenses from a multiplicity of organic materials have become available. Typical organic materials are diethylene glycol bisallyl carbonate or allyl diglycol carbonate (ADC), which are sold by the company PPG Industries under the brand name "Columbia Resin 39" or "CR 39", higher refractive thermosetting polymer materials, such as for example the polythiol urethanes sold under the trade names MR-7, MR-8, MR-10 of the company Mitsui Chemicals (the abbreviation "MR" stands here for "Mitsui Resin"), polymethylmethacrylate (abbreviation: PMMA) or polycarbonate.

Spectacle lenses may include coatings. The optical coating of a spectacle lens may include an antireflective coating, a reflective coating, a hard coating, a dirt-repelling coating, a coating preventing or reducing fogging and a coating with an antistatic effect. Finally, there are coatings with a polarizing effect and coatings that produce a desired color impression. Each of these coatings may be formed by one or more individual optically transparent layers. Examples can be taken from the documents WO 10/109154 A1, WO 01/55752 A1 and DE 10 2008 041 869 A1.

A plurality of publications and patent documents deal with the task to reduce the impact of blue light, ranging in wavelength from approximately 400 nm to approximately 500 nm, having been identified as contributing cause of AMD (age related macular degeneration). In particular, United States patent application publication 2007/0216861 A1 discloses an ophthalmic lens blocking wavelengths of the electromagnetic spectrum between about 400 and about 500 nm and transmitting at least 85% of wavelengths of the electromagnetic spectrum outside between about 400 and about 500 nm. This document discloses that the known techniques to block blue light wavelengths include absorption, reflection, interference, or any combination thereof. According to one technique described therein, a lens may be tinted/dyed with a blue blocking tint, such as BPI Filter Vision 450 or BPI Diamond Dye 500, in a suitable proportion or concentration. The tinting may be accomplished, for example, by immersing the lens in a heated tint pot containing a blue blocking dye solution for some predetermined period of time. According to another technique which is also disclosed in United States patent application publication 2007/0216861 A1, a filter is used for blue blocking. The filter could include, for example, organic or inorganic compounds exhibiting absorption and/or reflection of and/or interference with blue light wavelengths. The filter could include multiple thin layers or coatings of organic and/or inorganic substances. Each layer may have properties, which, either individually or in combination with other layers, absorbs, reflects or interferes with light having blue light wavelengths. Rugate notch filters are one example of blue blocking filters. Still another technique for blue blocking disclosed in United States patent application publication 2007/0216861 A1 is the use of multi-layer dielectric stacks. Multi-layer dielectric stacks are fabricated by depositing discrete layers of alternating high and low refractive index materials. Similarly to rugate filters, configuration parameters such as individual layer thickness, individual layer refractive index, and number of layer repetitions determine the performance parameters for multi-layer dielectric stacks.

Another patent document dealing with materials and methods for mitigating the harmful effects of blue light is WO 2015/171781 A1. This document proposes a spectacle lens having a front face and a rear face. The spectacle lens including a substrate having a front surface and a rear surface; and a first multilayer dielectric coating disposed on the front surface of the substrate. The front face of the spectacle lens exhibits a maximum reflectance in the visible spectrum at a wavelength of from 430 nm to 470 nm, wherein the front face of the optical lens exhibits a reflectance of from 2% to 18% reflectance at 400 nm, of from 5% to 30% reflectance at 450 nm, and of from 3% to 20% reflectance at 500 nm. The front face of the optical lens shall exhibit a reflectance spectrum having a full width at half maximum of at least 75 nm. The transmission properties of the spectacle lens are not discussed therein.

Many people absolutely love driving. But for most of the people, driving is a necessity that provides them with a high degree of independence. However, studies have shown that many people feel insecure, tense, and stressed when driving—particularly when visibility is poor: in the rain, in foggy or misty conditions, and at dawn or dusk. When driving, good visibility is an absolute must for safety and accident prevention. If visibility is poor, drivers get tired more quickly and react more slowly.

SUMMARY OF THE INVENTION

It is therefore an object of the present invention to provide a spectacle lens which improves vision during car driving during rain, in foggy or misty conditions, and at dawn or dusk but which is also suitable for general purpose wear and to provide a respective method for producing such a spectacle lens.

The inventors cared about the question what drivers do really need for good vision. What requirements do driving glasses need to meet these days?. The inventors examined this subject in great detail. The inventors found out that in traffic, many people find the glare caused by the headlights of approaching vehicles, streetlights or reflections extremely irritating. This is particularly the case when driving in twilight or at night when the pupils of our eyes are dilated. Market research and scientific evidence both indicate that perceived glare in traffic is linked to modern car lighting technology, and in particular to LED (light emitting diode) and Xenon HID (high-intensity discharge) light sources.

This makes it all the more important to have the appropriate glare protection in order to make driving more comfortable and safer.

The inventors recognized that the spectral irradiance of LED and Xenon HID light sources used for automobile headlights differs significantly from that of formerly used light bulbs. In particular, while the thermal radiation of a light bulb includes one significant maximum being close to the respective maxima of the photopic and scotopic luminosity functions of human visual perception, white LED and Xenon HID automobile headlights have a spectral irradiance with mainly two distinct peaks with their maxima at wavelengths of around 440 to 445 nm and 540 to 560 nm. Moreover, the irradiance peak value at lower wavelengths exceeds the peak value at higher wavelengths the closer the irradiance spectrum of the headlights conforms to the cool white light spectrum and the more it deviates from the warm white light spectrum.

The inventors have found out that cool white headlights improve visibility of objects being illuminated therewith for the driver but have the drawback that headlights of cars moving towards the driver cause glare. Therefore, it is advisable to reduce perception of the spectral irradiance of the blue light peak by means of a respective filter property of the spectacle lens used by the car driver.

However, significant reduction of the blue light peak has the fundamental drawback that objects being illuminated with the headlights are less or not visible any more. In addition, the perception of objects during daylight gets yellowish the more the perceptibility of the blue light peak is reduced.

Therefore, the inventors propose a spectacle lens in particular for car drivers having a front surface intended to be fitted away from the eye and a back surface intended to be fitted nearer to the eye, whereby the spectacle lens includes a substrate being made from mineral glasses or an organic material and whereby the spectacle lens has selective light wavelength filter properties, namely blue light attenuating properties. The selective light wavelength filter properties include:

a spectral transmittance between 80% and 95% for all wavelengths in a wavelength range between 428 nm and 452 nm for a light ray entering the spectacle lens on the front surface with an angle of incidence of 0° a spectral transmittance between 95% and 100% for all wavelengths in a wavelength range between 500 nm and 700 nm for a light ray entering the spectacle lens on the front surface with an angle of incidence of 0° and a yellowness index (YI E313) per ASTM Method E313 of no more than 10 for a standard illuminant D65 and a standard observer function of 2° (D65/2°).

The spectral transmittance $T(\lambda)$ is the ratio of the spectral radiant flux transmitted by the material to the incident spectral flux at any specified wavelength $\lambda$.

The substrate may consist of an organic material such as diethylene glycol bisallyl carbonate or allyl diglycol carbonate (ADC), higher refractive thermosetting polymer materials, such as for example the polythiol urethanes sold under the trade names MR-7, MR-8, MR-10, polymethylmethacrylate (PMMA) or polycarbonate. Different examples of suitable materials include TRIVEX (commercially available from PPG Industries), SPECTRALITE (commercially available from Carl Zeiss Vision), ORMEX (commercially available from Essilor), acrylic, MR-6 (commercially available from Mitsui Chemicals), MR-20 (commercially available from Mitsui Chemicals), MR-174 (commercially available from Mitsui Chemicals), FINALITE (commercially available from Carl Zeiss Vision), NL4 (commercially available from Nikon), 1.70 EYRY (commercially available from Hoya), HYPERINDEX 174 (commercially available from Optima), NL5 (commercially available from Nikon), plastics commercially available from Tokai Optical Co., Ltd. The substrate may also consist of a mineral glass, for example, crown glass, flint glass, PHOTOGRAY EXTRA glass commercially available from Corning, and high index glasses such as those commercially available from Carl Zeiss Vision.

The invention is applicable for all kind of spectacle lenses, in particular the spectacle lenses can be corrective or non-corrective; spectacle lenses can also be prescription or non-prescription. The spectacle lenses can be made for use in clear eyeglasses or tinted eyeglasses (for example, photochromic or polarizing sunglasses). Spectacle lenses may include variable power across their surface area. In particular, the latter spectacle lenses are, for example, known as bifocals, progressives et cetera.

The problem indicated above is completely solved by such spectacle lens.

An advantageous embodiment of the spectacle lens according to the invention is characterized in that the selective light wavelength filter properties include a spectral transmittance between 80% and 90% for all wavelengths (A) in a wavelength range between 428 nm and 452 nm for a light ray entering the spectacle lens on the front surface with an angle of incidence of 0°. A spectral transmittance in the range provides sufficient attenuation of the above described blue light peak of most presently commercialized LED and Xenon HID automobile head light sources being advertised as emitting a "cool white" spectral irradiance in order to significantly reduce glare but allowing good perception of illuminated objects.

More advantageously, the selective light wavelength filter properties may include a spectral transmittance between 80% and 88% for all wavelengths in a wavelength range between 432 nm and 448 nm for a light ray entering the spectacle lens on the front surface with an angle of incidence of 0°. Such a spectral transmittance filter property ensures sufficient attenuation of the peak maximum.

Another advantageous embodiment according to the present invention alternatively or in addition to the features described with respect to the previous embodiments is characterized in that the selective light wavelength filter properties include a spectral transmittance between 97% and 100% for all wavelengths in a wavelength range between 500 nm and 700 nm for a light ray entering the spectacle lens on the front surface with an angle of incidence of 0°. This feature ensures that attenuation of any visible non-blue irradiation is limited as far as possible while at the same time attenuating blue irradiation to a degree sufficient to mainly avoid glare but to allow sufficient perceptibility of illuminated (blue and gray) objects.

Still another advantageous embodiment according to the present invention alternatively or in addition to the features described with respect to the previous embodiments is characterized in that the selective light wavelength filter properties include a spectral transmittance even between 97.8% and 100% for all wavelengths in a wavelength range between 500 nm and 700 nm for a light ray entering the spectacle lens on the front surface with an angle of incidence of 0°. The higher the value for the spectral transmittance in the wavelength range is used the more blue light may be attenuated from a safety perspective when driving a car under conditions headlights of approaching vehicles, streetlights or reflections are irradiating. On the other hand the blue filter functionality has to be limited to the wavelength range of the blue peak emission of the headlight mainly in order to fulfill the yellowness index requirement of less than 10 under photopic conditions indicated above.

A further embodiment according to the present invention alternatively or in addition to the features described with respect to the previous embodiments is characterized in that the selective light wavelength filter properties include a yellowness index (YI E313) per ASTM Method E313 of no more than 8, preferably of no more than 7 for a standard illuminant D65 and a standard observer function of 2° (D65/2°). This very feature is desirable in particular for general use purposes under daylight conditions which require a mainly undisturbed color perception. In particular, health professionals, physicians or the like may require such true color perception.

One embodiment according to the alternatively or in addition to the features described with respect to the previous embodiments is characterized in that the substrate includes at least one of a dye, a pigment and a tint absorbing light of all wavelengths in the wavelength range between 428 nm and 452 nm, in particular between 432 nm and 448 nm. Conventional 'blue attenuating' organic yellow dyes are selected from the group of a coumarin, a perylene, an acridine, a porphyrin, or a combination thereof. For example, the material can include less than 0.01% by weight of dyes or pigments or the like that absorb blue light, based on the total weight of the substrate material.

The respective dyes, pigments or tints may have been incorporated into the substrate material during molding the spectacle lens. Alternatively or additionally the respective dyes, pigments or tints may have been incorporated into the substrate material by dipping the substrate into a respective liquid (re-)agens including the respective dyes, pigments or tints during which the respective dyes, pigments or tints penetrating into the substrate material and/or covering the substrate material.

Advantageous embodiments of such spectacle lenses according to the invention are therefore characterized in that the substrate incorporating the at least one of a dye, a pigment and a tint and/or the substrate being covered by the at least one of a dye, a pigment and a tint.

The amount or portion or volume of the at least one of a dye, a pigment and a tint being incorporated into the substrate and/or being applied to the substrate advantageously is adjusted such that it absorbs between 5% and 20% of the light entering the spectacle lens on the front surface with the angle of incidence of 0° of all wavelengths in the wavelength range between 428 nm and 452 nm. Preferably, the amount or portion or volume of the at least one of a dye, a pigment and a tint being incorporated into the substrate and/or being applied to the substrate is determined such that the at least one of a dye, a pigment and a tint absorb between 10% and 20% of the light entering the spectacle lens on the front surface with the angle of incidence of 0° of all wavelengths in the wavelength range between 428 nm and 452 nm.

Another embodiment according to the invention is characterized in that the substrate alternatively or in addition to including at least one of a dye, a pigment and a tint carries at least one of a dielectric stack or a multilayer dielectric coating reflecting light of all wavelengths in at least one of the wavelength ranges between 428 nm and 452 nm or between 432 nm and 448 nm, respectively. A dielectric stack may include a series of alternating discrete layers of high refractive index materials and low refractive index materials and as the case may be intermediate refractive index materials. A multilayer dielectric coating may include a multilayer dielectric stack.

Dielectric stacks of the type used in conjunction with the present invention can be fabricated using suitable thin-film deposition methods. Common techniques include physical vapor deposition (which includes evaporative deposition and ion beam assisted deposition), chemical vapor deposition, ion beam deposition, molecular beam epitaxy, and sputter deposition. The overall thickness of the multilayer dielectric coating disposed on one or both sides of the substrate can range from 200 nm to several microns.

The number of alternating dielectric layers as well as the composition of the layers in the dielectric coating can be varied so as to provide a material exhibiting the desired level of blue attenuating for a particular application. In some cases, the multilayer dielectric coating on one side of the substrate may include at least 6 dielectric layers. In certain embodiments, the multilayer dielectric coating can include from 6 to 10 dielectric layers (for example, 6 dielectric layers, 7 dielectric layers, 8 dielectric layers, 9 dielectric layers, or 10 dielectric layers).

Each dielectric layers in the coating(s) can independently be formed from any suitable dielectric material, such as a metal oxide, a metal fluoride, a metal nitride, a diamond-like carbon, or a combination thereof.

In some cases, the multilayer dielectric coating(s) deposited on one or both sides of the substrate include dielectric layers that are each independently formed from a metal oxide selected from the group consisting of chromium oxide, aluminum oxide, titanium oxide, indium tin oxide, zirconium oxide, silicon dioxide, and combinations thereof.

One embodiment according to the invention is characterized in that the dielectric stack reflecting between 5% and 20% of the light entering the spectacle lens on the front surface with the angle of incidence of 0° of all wavelengths in the wavelength range between 428 nm and 452 nm. One embodiment according to the invention is characterized in that the dielectric stack reflecting between 5% and 20% of the light entering the spectacle lens on the front surface with the angle of incidence of 0° of all wavelengths (A) in the wavelength range between 432 nm and 448 nm. One embodiment according to the invention is characterized in that the dielectric stack reflecting between 10% and 20% of the light entering the spectacle lens on the front surface with the angle of incidence of 0° of all wavelengths (A) in the wavelength range between 428 nm and 452 nm. One embodiment according to the invention is characterized in the dielectric stack reflecting between 10% and 20% of the light entering the spectacle lens on the front surface with the angle of incidence of 0° of all wavelengths (A) in the wavelength range between 432 nm and 448 nm. One embodiment according to the invention is characterized in that the multilayer dielectric coating reflecting between 5% and 20% of the light entering the spectacle lens on the front surface with the angle of incidence of 0° of all wavelengths (A) in the wavelength range between 428 nm and 452 nm. One embodiment according to the invention is characterized in that the multilayer dielectric coating reflecting between 5% and 20% of the light entering the spectacle lens on the front surface with the angle of incidence of 0° of all wavelengths (A) in the wavelength range between 432 nm and 448 nm. One embodiment according to the invention is characterized in that the multilayer dielectric coating reflecting between 10% and 20% of the light entering the spectacle lens on the front surface with the angle of incidence of 0° of all wavelengths (A) in the wavelength range between 428 nm and 452 nm. Still one embodiment according to the invention is characterized in that the multilayer dielectric coating reflecting between 10% and 20% of the light entering the spectacle lens on the front surface with the angle of incidence of 0° of all wavelengths (λ) in the wavelength range between 432 nm and 448 nm.

Preferably, the spectacle lens according to the invention is characterized in that the dielectric stack or the multilayer dielectric coating being applied to only a front side of the substrate but not to a back side of the substrate, the front side being intended to be fitted away from the eye and the back side being intended to be fitted nearer to the eye.

The back side of the substrate may carry another kind of dielectric stack or another kind of multilayer dielectric coating. Such another kind of dielectric stack or another kind of multilayer dielectric coating may have antireflection properties for all visible wavelengths but no or only minor blue attenuating properties.

As the case may be both sides of the substrate may carry such another kind of dielectric stack or another kind of multilayer dielectric coating have antireflection properties for all visible wavelengths but no or only minor blue attenuating properties. The blue attenuating properties may be a result of above mentioned dye, pigment and/or tint. Such kind of spectacle lenses do have the advantage that light entering from the back surface may not be reflected in direction of the eye and therefore may not cause glare.

In another advantageous embodiment of the invention the spectacle lens is characterized in that the dielectric stack and/or the multilayer dielectric coating causing the blue attenuating properties having a photopic luminous reflection below 0.75%. Minimizing residual reflection is advantageous from a viewpoint of persons viewing upon the person wearing spectacle lenses according to the invention.

Still another advantageous embodiment of a spectacle lens according to the invention in addition or alternatively to the features of the embodiments disclosed above may be characterized in that the selective light wavelength filter properties including an overall transmittance of more than 97% in the wavelength range between 400 nm and 800 nm for a light ray entering the spectacle lens on the front surface with an angle of incidence of 0°. This feature ensures that only minor darkening is induced by the spectacle lens and wearer's perception of the brightness corresponds mainly to the brightness he would perceive without having spectacles in front of his eyes.

The requirements to a spectacle lens for a car driver the inventors derived from their analysis discussed in the foregoing paragraphs result in a respective method for production of a spectacle lens in particular for car drivers, whereby the spectacle lens having a front surface intended to be fitted away from the eye and a back surface intended to be fitted nearer to the eye, whereby the spectacle lens including a substrate being made from mineral glasses or an organic material and whereby the spectacle lens having selective light wavelength filter properties, wherein the selective light wavelength filter properties being determined by the following steps:

providing a spectral irradiance of an automobile headlight
determining an irradiance for at least one wavelength in a wavelength range between 428 nm and 452 nm
determining an irradiance for at least one wavelength in a wavelength range between 500 nm and 650 nm
determining a ratio between the determined irradiance for the at least one wavelength (λ) in the wavelength range between 428 nm and 452 nm and the determined irradiance for the at least one wavelength in the wavelength range between 500 nm and 650 nm and/or determining a ratio between the determined irradiance for the at least one wavelength in the wavelength range between 500 nm and 650 nm and the determined irradiance for the at least one wavelength in the wavelength range between 428 nm and 452 nm
defining an amount of attenuating spectral transmittance for at least one wavelength in the wavelength range between 428 nm and 452 nm for a light ray entering the spectacle lens on the front surface with an angle of incidence of 0° if the determined ratio between the determined irradiance for the at least one wavelength in the wavelength range between 428 nm and 452 nm and the determined irradiance for the at least one wavelength in the wavelength range between 500 nm and 650 nm exceeds or equals a predetermined (upper) threshold value or defining an amount of attenuating spectral transmittance for at least one wavelength in the wavelength range between 428 nm and 452 nm for a light ray entering the spectacle lens on the front surface with an angle of incidence of 0° if the determined ratio between the determined irradiance for the at least one wavelength in the wavelength range between 500 nm and 650 nm and the determined irradiance for the at least one wavelength in the wavelength range between 428 nm and 452 nm is below or equals a predetermined (lower) threshold value.

The problem indicated above is completely solved by such a method.

The upper threshold value may, for example, be 2 (corresponding to a lower threshold value of 0.5). The upper threshold value may, for example, be 1.5 (corresponding to a lower threshold value of 2/3). Preferably, the upper threshold value may be in the range between 3 and 1.5, preferably between 2 and 1.5.

Defining an amount of attenuating spectral transmittance for at least one wavelength in the wavelength range between 428 nm and 452 nm for a light ray entering the spectacle lens on the front surface with an angle of incidence of 0° may, for example, be attenuating the transmittance for the blue peak of the spectral irradiance of the automobile headlight by means of the filter properties of the spectacle lens such that the ratio of the irradiance of the blue peak and the irradiance of the red peak remains below the upper threshold.

The method according to the invention may include at least one of the steps:
determining a spectral transmittance between 95% and 100% for all wavelengths (λ) in a wavelength range between 500 nm and 700 nm for a light ray entering the spectacle lens on the front surface with an angle of incidence of 0°
determining a yellowness index (YI E313) per ASTM Method E313 of no more than 10 for a standard illuminant D65 and a standard observer function of 2° (D65/2°)
determining an overall transmittance of more than 97% in a wavelength range between 400 nm and 800 nm for a light ray entering the spectacle lens on the front surface with an angle of incidence of 0°
fabricating the spectacle lens according to the selective light wavelength filter properties being determined.

BRIEF DESCRIPTION OF THE DRAWINGS

The invention will now be described with reference to the drawings wherein:

FIG. 1 shows the spectral transmittances T for a light ray entering a front surface of different spectacle lenses according to the prior art at normal incidence:

curve a) is the spectacle lens being made of MR-8 material without any coating and without any coloring dye;

curve b) is the spectacle lens being made of MR-8 material incorporating a blue blocking dye being commercialized under the trade name Dianix yellow AC-E;

FIG. 2 shows the normalized irradiance of a "cool white" LED automobile headlight:

curve a) is the irradiance of a "cool white" LED automobile headlight without any filter;

curve b) is the irradiance of the "cool white" LED automobile headlight according to curve a) measured after transmitting the spectacle lens of FIG. 1 (curve b) incorporating the blue blocking dye;

FIG. 3 shows the normalized irradiance of a "cool white" LED automobile headlight:

curve a) is the irradiance of a "cool white" LED automobile headlight without any filter (same spectrum as shown in FIG. 2 (curve a));

curve b) is the target irradiance of the "cool white" LED automobile headlight according to curve a) measured after transmitting a spectacle lens including a blue attenuating filter according to the invention and the spectral transmittance T of a light ray entering a front surface of the spectacle lens including a blue attenuating filter according to the invention of FIG. 3 (curve b) at normal incidence;

FIG. 4 shows the spectral transmittances T for a light ray entering a front surface of different spectacle lenses at normal incidence:

curve a) is the spectacle lens being made of MR-8 material without any coating and without any coloring dye (same spectrum as shown in FIG. 1 (curve a))—prior art;

curve b) is the spectacle lens being made of MR-8 material of FIG. 4 but including a standard antireflection coating on front and back surfaces—prior art;

curve c) is the spectacle lens being made of MR-8 material of FIG. 4 but including a blue attenuating antireflection coating on front and back surfaces—invention;

curve d) is the spectacle lens being made of MR-8 material of FIG. 4 but including a blue attenuating antireflection coating on the front surface and a standard antireflection coating on the back surface—invention;

FIG. 5 shows the normalized irradiance of a "cool white" LED automobile headlight:

curve a) is the irradiance of a "cool white" LED automobile headlight without any filter (same spectrum as shown in FIG. 2 (curve a));

curve b) is the irradiance of the "cool white" LED automobile headlight according to a) measured after transmitting the spectacle lens according to FIG. 4 (curve d));

DESCRIPTION OF THE PREFERRED
EMBODIMENTS OF THE INVENTION

Figure 2:
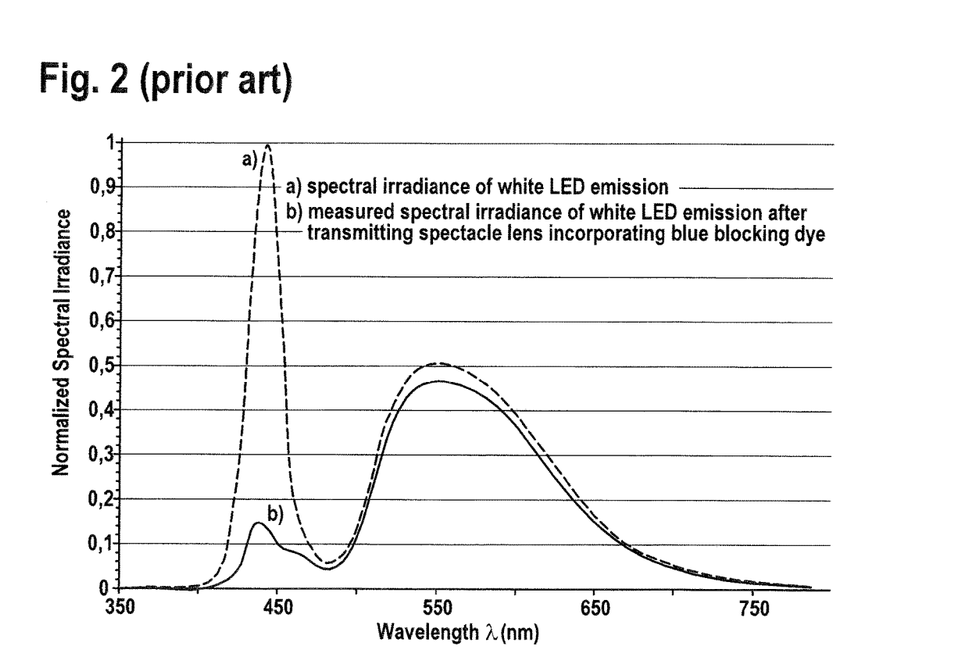

FIG. 2, curve a) shows the normalized irradiance of a presently typically used "cool white" LED automobile headlight. As may be seen from the spectrum the spectral irradiance includes mainly two distinct peaks with their maxima at wavelengths of around 440 to 445 nm (herein called the blue peak) and 540 to 560 nm (herein called the red peak). Moreover, the irradiance peak value at lower wavelengths, the blue peak maximum, exceeds the peak value at higher wavelengths, the red peak maximum. As already explained above it is desirable to attenuate the perception of the blue peak maximum as compared to the red peak maximum. In particular it is desirable not to attenuate the perception of the red peak maximum but to attenuate the blue peak maximum to a certain degree for a car driver.

Figure 1:
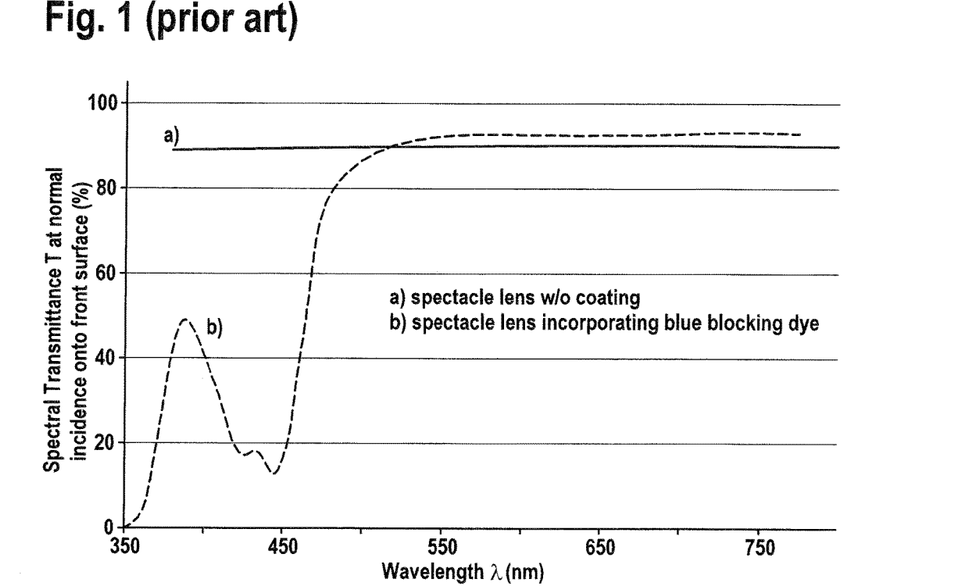

FIG. 1 shows the spectral transmittances T for a light ray entering a front surface of different spectacle lenses according to the prior art at normal incidence. FIG. 1, curve a) shows the spectral transmittance of a spectacle lens being made of MR-8 material without carrying any coating and without including any coloring dye incorporated or applied thereon. Such a lens has an overall transmission in the visible spectral range of approximately 90%. This means that the wearer's perception is a reduced overall brightness when looking through his spectacles.

FIG. 1, curve b) shows the spectral transmittance of a spectacle lens being made of MR-8 material incorporating a blue blocking dye being commercialized under the trade name Dianix yellow AC-E. As may be seen in the drawing shown in FIG. 2, curve b) a person wearing such a spectacle lens perceives the blue portion of the irradiation of the headlights strongly attenuated while the green and red portions of the irradiation of the headlights remain nearly non-attenuated. Such a spectacle lens significantly reduces perception of glare for the wearer but has the drawback that people wearing blue colored or grey clothes and being illuminated by the headlights, only cannot be perceived by the wearer of the spectacle lens. This might cause dangerous situations if the wearer drives a car.

Therefore, the inventors developed a method for the production of a spectacle lens in particular for car drivers, whereby the spectacle lens having a front surface intended to be fitted away from the eye and a back surface intended to be fitted nearer to the eye, whereby the spectacle lens including a substrate being made from mineral glasses or an organic material. This method is characterized in defining selective light wavelength filter properties of the spectacle lens in order to improve wearer's vision when driving a car during rain, in foggy or misty conditions, or at dawn or dusk but which is also suitable for general purpose wear under common use conditions.

The method steps according to a specific embodiment according to the invention are explained in the following by referring to the drawings shown in FIG. 9 and FIG. 3.

Figure 9:
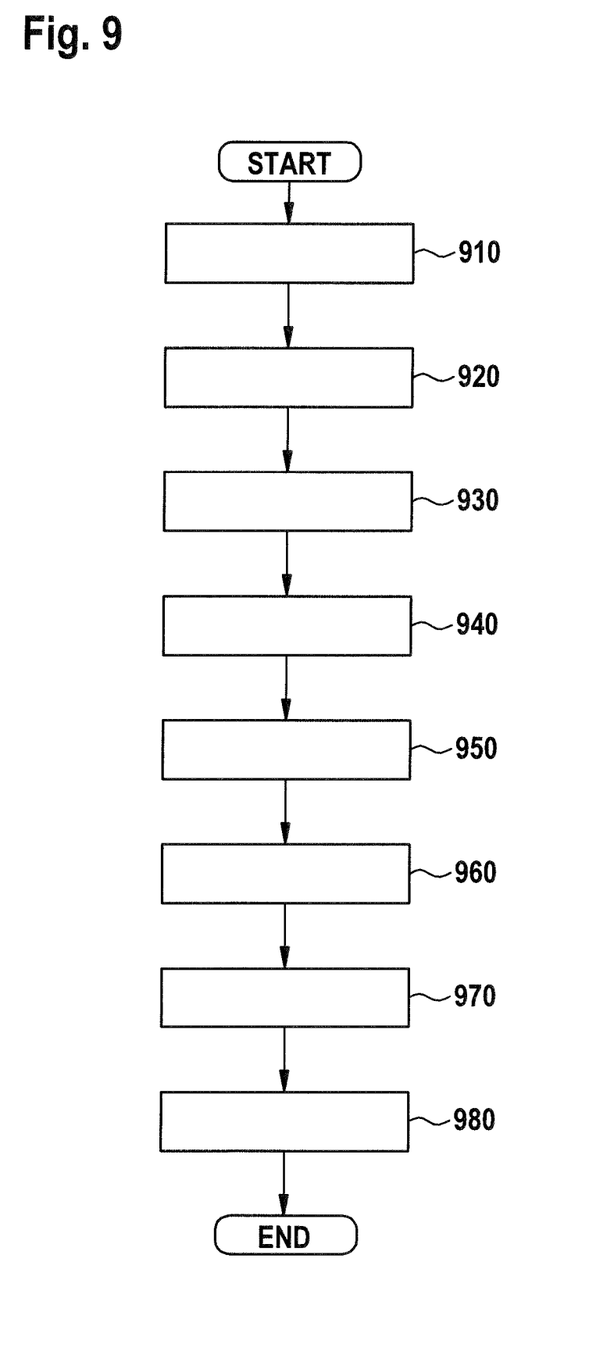

In method step 910 shown in FIG. 9 a spectral irradiance of a typical automobile headlight is provided. The dashed line indicated with a) in FIG. 3 shows such a common spectral irradiance (it is the same as already shown in FIG. 2 indicated with a), also). The spectrum is normalized to the maximum intensity of the blue peak at around 443 nm. There is another local intensity maximum, the red peak, at around 550 nm. The blue peak has a quite narrow full width at half maximum FWHM of approximately 25 nm while the red peak has a quite broad full width at half maximum of around 125 nm.

In step 920 an irradiance for at least one wavelength λ in a wavelength range between 428 nm and 452 nm is determined. In the present example the irradiance at the blue peak is used. It is possible to use the absolute value as measured in W/m²/nm or the normalized value, for example, 1 in the present example.

In step 930 an irradiance for at least one wavelength λ in a wavelength range between 500 nm and 650 nm is determined. In the present example the irradiance at the red peak is used. It is possible to use the absolute value as measured in W/m²/nm or the normalized value, for example, 0.5 in the present example.

It is possible in steps 920 and 930 not to use only single values but also series of values which even may be weighted differently, however, the main idea consists in being able to calculate a relationship between both irradiance regimes in terms of a ratio as being described in the following with respect to step 940.

In step 940 a ratio between the determined irradiance for the at least one wavelength A in the wavelength range between 428 nm and 452 nm, here the value 1 at the blue peak, and the determined irradiance for the at least one wavelength λ in the wavelength range between 500 nm and 650 nm, here the value 0.5 at the red peak, is determined. The respective value of the ratio is 2 in the present case.

In the following step 950 the ratio being determined in step 940 (for example, the value 2) is compared with a predetermined threshold value. In the present case the threshold value is assumed to be 1.8. The result of the comparison is that the value of the ratio exceeds the value of the threshold.

Since the value of the ratio exceeds the threshold value in step 960 an amount of attenuating the spectral transmittance of the spectacle lens for at least one wavelength λ in the wavelength range between 428 nm and 452 nm for a light ray entering the spectacle lens on the front surface with an angle of incidence of 0° is determined. In the present case, the amount of attenuation is determined such that the blue peak is reduced to below 0.9 after transmission through the spectacle lens.

The next step 970 includes calculating the structure of a spectacle lens in terms of coating and substrate composition using, for example, a (for example commercially available) dielectric stack simulation tool and/or a (for example commercially available) dye composition simulation tool such that the in step 960 defined amount of attenuating spectral transmittance as well as a spectral transmittance between 95% and 100% for all wavelengths λ in a wavelength range between 500 nm and 700 nm for a light ray entering the spectacle lens on the front surface with an angle of incidence of 0° and a yellowness index (YI E313) per ASTM Method E313 of no more than 10 for a standard illuminant D65 and a standard observer function of 2° (D65/2°) is achieved. In this step 970 additional boundary conditions such as that the dielectric stack having been calculated has a photopic luminous reflection below 0.75% and/or that the spectacle lens has an overall transmittance of more than 97% in a wavelength range between 400 nm and 800 nm for a light ray entering the spectacle lens on the front surface with an angle of incidence of 0° may also be taken into consideration.

In the last step 980 the spectacle lens according to the selective light wavelength filter properties being determined is fabricated.

Figure 3:
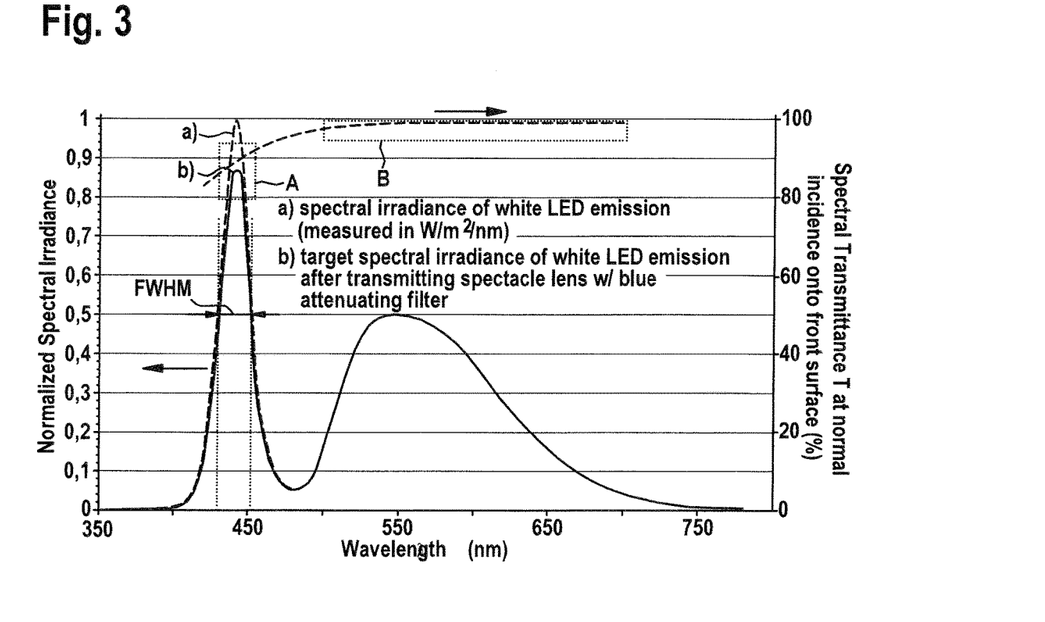

The preferred result for the filter properties of a spectacle lens taking into consideration the spectral irradiance of the above typical automobile headlight is defined by a spectral transmittance between 80% and 95% for all wavelengths in a wavelength range between 428 nm and 452 nm for a light ray entering the spectacle lens on the front surface with an angle of incidence of 0° as indicated by the region A in FIG. 3, a spectral transmittance between 95% and 100% for all wavelengths (λ) in a wavelength range between 500 nm and 700 nm for a light ray entering the spectacle lens on the front surface with an angle of incidence of 0° as indicated by the region B in FIG. 3 and a yellowness index (YI E313) per ASTM Method E313 of no more than 10 for a standard illuminant D65 and a standard observer function of 2° (D65/2°). The spectral transmittance of a hypothetical spectacle lens fulfilling the requirements is indicated by the dashed line in FIG. 3.

Two embodiments of spectacle lenses having been configured in order to fulfill the spectral filter properties indicated above are explained in the following referring to the drawings shown in FIGS. 4 to 7.

Figure 6:
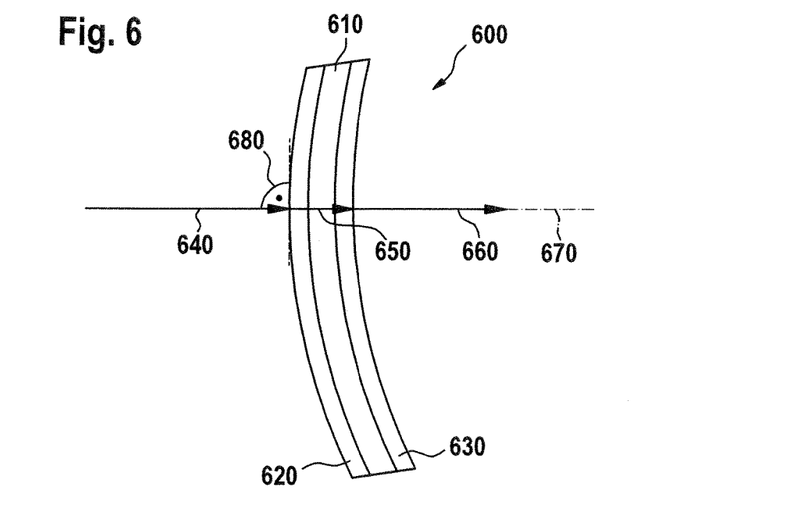
FIG. 6 shows the cross section of a first embodiment of a spectacle lens according to the invention providing the spectral transmittance shown in FIG. 4 (curve c))

FIG. 6 shows the cross section of a first embodiment of a spectacle lens 600 according to the invention. The spectacle lens 600 shown in a partial section, which is not true to scale, in FIG. 6 has a substrate 610 made of plastic, for example the plastic MR-8. Both sides of the substrate 610 are covered with coatings (620, 630) being described in more detail below.

FIG. 6 also shows the measurement conditions for determining transmittance and yellowness index. In particular, a light ray 640 enters the spectacle lens at its convex front side, transmits the spectacle lens 600 including coating 620, substrate 610, coating 630 as indicated by arrow 650 and leaves the spectacle lens 600 at its concave back surface before entering a measuring apparatus (not shown) but indicated by the dashed line 670. The light ray 640 enters the front surface at normal incidence 680, for example, 0° (angle of incidence) with respect to the surface normal of the front surface at its entrance point (in general the far vision measurement point) in order to measure transmittance. Determination of the yellowness index shall be at an angle of incidence of 2°, instead.

This first embodiment refers to a spectacle lens 600 having identical coatings (620, 630) at each side of its substrate 610. The coatings (620, 630) include a hard lacquer layer being situated on the substrate body 610 and adjoining the substrate body 610. The hard lacquer layer is applied with a sol-gel hard lacquer composition that is preferably spun onto the substrate body 610 via spin coating or applied via dip coating. The hard coat layer has a thickness of 3000 nm and provides together with the other layers described in the following a high abrasion resistivity with a Bayer ratio of more than 10.

On the hard lacquer layer there is a coating embodied as a layer stack and having an antireflection coating with blue reflecting properties, which includes a plurality of partial layers, and a topcoat. In direct contact with the hard coat is an adhesion promoting layer of Cr/SiO having been applied with or without a pre-etching step. The thickness of this layer is approx. 0.6 nm. This layer stack in addition includes a layer made of aluminum oxide ($Al_2O_3$) having a thickness of 20 nm. A 170 nm thick layer made of quartz and aluminum oxide ($SiO_2/Al_2O_3$) is situated on the aluminum oxide layer. A further layer made of titanium oxide, the thickness of which is 15 nm, lies above the $SiO_2/Al_2O_3$ layer. The titanium oxide layer is followed by a 47 nm thick further layer made of $SiO_2/Al_2O_3$. The latter is coated with a 3 nm thick indium tin oxide layer. A high refractive index layer, which is highly refractive with respect to visible light and is made of titanium oxide and is 29.8 nm thick, is applied on the ITO layer. On the titanium oxide layer there is then applied a layer made of aluminum oxide and quartz having a thickness of 114 nm, which is coated by a top coat layer of 5 nm providing super hydrophobic properties. The material of the latter layer is preferably a material from the class of the perfluorinated alkanes, which are then chemically coupled via a silane-functional group to the OH groups of the preceding layer constructed from quartz and aluminum oxide. These OH groups on the surface are also designated as so-called silanol groups by those skilled in the art. The complete layer structure of the coatings 620, 630 being on top of both sides of the MR-8 substrate 610 is summarized in Table 1.

TABLE 1

Blue attenuating antireflection coating (620, 630) applied to the front side and the back side of the substrate 610 of invented spectacle lens 600 shown in FIG. 6

|  | Coating Structure | Thickness (nm) |
|---|---|---|
| Substrate | MR8 |  |
| Hard Coat | High Index Hard Resin | 3000 |
| Pre-etching | — |  |
| Adhesion | Cr/SiO | 0.6 |
| Layer 1 | $Al_2O_3$ | 20.0 |
| Layer 2 | $SiO_2/Al_2O_3$ | 170.0 |
| Layer 3 | $TiO_2$ | 15.0 |
| Layer 4 | $SiO_2/Al_2O_3$ | 47.0 |
| Layer 5 | ITO | 3.0 |
| Layer 6 | $TiO_2$ | 29.8 |
| Layer 7 | $SiO_2/Al_2O_3$ | 114.0 |
| Layer 8 | Top Coat (CC) = Super Hydrophobic Coating | 5.0 |

The layer stack of the antireflection coatings (620, 630) is produced in an electron beam evaporation arrangement. Such an arrangement has a vacuum chamber, in which the substrate body 610 of the spectacle lens 600 with the hard lacquer layer applied thereon is arranged. Via an electron beam, the material of the individual layers is sequentially evaporated in the vacuum chamber, such that it deposits sequentially on the substrate body 610. The electron beam evaporation arrangement preferably contains an ion source, which enables the layers vapor-deposited onto the substrate body 610 to be densified during the vapor deposition.

The configuration, that is, sequence structure of layers of the antireflection coatings (620, 630) is calculated by means of a calculation engine of the company OptiLayer GmbH in Garching, Germany being commercialized in Europe by Langbein Thelen Consulting in Heidelberg, Germany. Further distributors are shown in http://www.optilayer.com/distributors.

Figure 4:
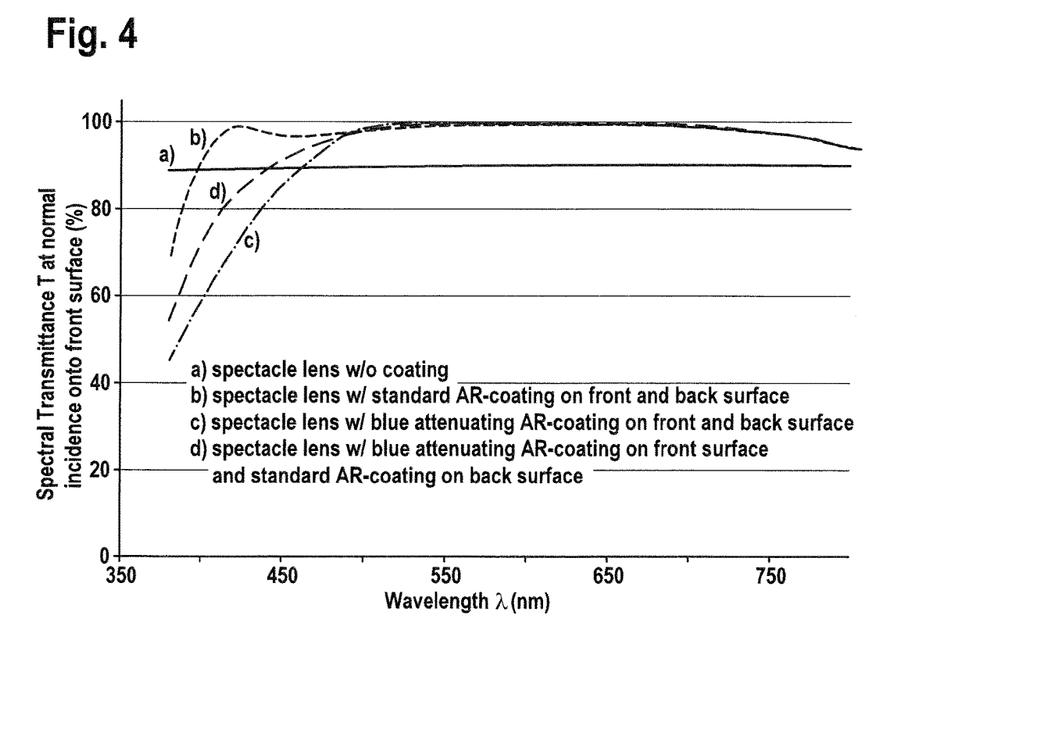
Figure 5:
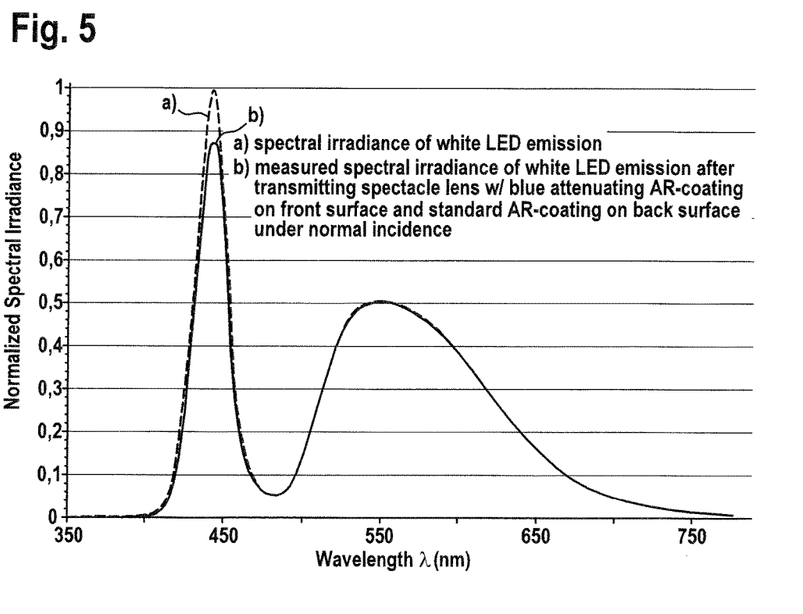

This spectacle lens 600 provides a spectral transmittance as shown in FIG. 4, curve c). The spectral transmittances of a spectacle lens made of the same substrate material MR-8 but being not covered by any coating is shown in FIG. 4, curve a) for comparison purposes also. Further properties of the spectacle lens 600 are: The antireflection coatings (620, 630) provide a blue residual reflection color at an angle of incidence of 0°, a luminous transmittance of more than 98% and a yellowness index of less than 3 as well as the above indicated high scratch and abrasion resistance indicated by a Bayer ratio of more than 10.

Figure 7:
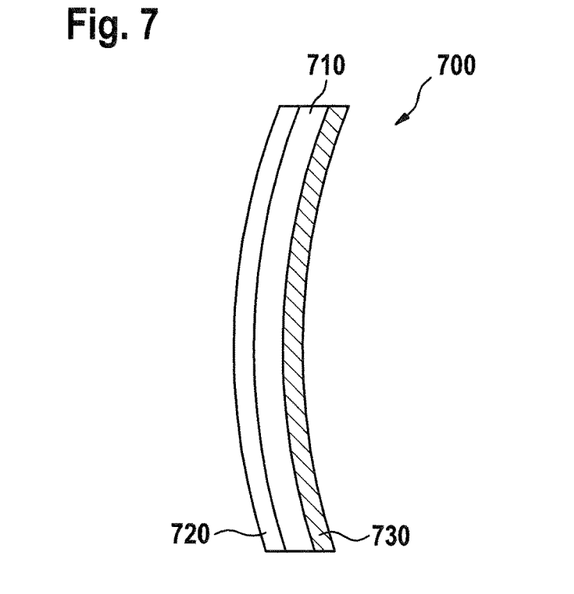
FIG. 7 shows the cross section of a second embodiment of a spectacle lens according to the invention providing the spectral transmittance shown in FIG. 4 (curve d))

FIG. 7 shows the cross section of a second embodiment of a spectacle lens 700 according to the invention. The spectacle lens 700 shown in a partial section, which is not true to scale, in FIG. 7 has a substrate 710 made of plastic, for example the plastic MR-8. Both sides of the substrate 710 are covered with coatings (720, 730).

While the front side of the substrate 710 is covered with the same coating 620 described above, the back side of the substrate 710 is covered with a different layer structure. The layer structures on top the front side of the substrate and on top of the back side of the substrate are shown in the following Tables 2 and 3, respectively.

TABLE 2

Blue attenuating antireflection coating 720 applied to the front side of the substrate 710 of a spectacle lens 700 according to the invention shown in FIG. 7

|  | Coating Structure | Thickness (nm) |
|---|---|---|
| Substrate | MR8 |  |
| Hard Coat | High Index Hard Resin | 3000 |
| Pre-etching | — |  |
| Adhesion | Cr/SiO | 0.6 |
| Layer 1 | $Al_2O_3$ | 20.0 |
| Layer 2 | $SiO_2/Al_2O_3$ | 200.0 |
| Layer 3 | $TiO_2$ | 19.0 |
| Layer 4 | $SiO_2/Al_2O_3$ | 39.0 |
| Layer 5 | ITO | 3.0 |
| Layer 6 | $TiO_2$ | 24.2 |
| Layer 7 | $SiO_2/Al_2O_3$ | 106.0 |
| Layer 8 | Top Coat (CC) = Super Hydrophobic Coating | 5.0 |

TABLE 3

Standard antireflection coating 730 applied to the back side of the substrate 710 of a spectacle lens 700 according to the invention shown in FIG. 7

|  | Coating Structure | Thickness (nm) |
|---|---|---|
| Substrate | MR8 |  |
| Hard Coat | High Index Hard Resin | 3000 |
| Pre-etching | — |  |
| Adhesion | Cr/SiO | 0.6 |
| Layer 1 | $Al_2O_3$ | 20.0 |
| Layer 2 | $SiO_2/Al_2O_3$ | 170.0 |
| Layer 3 | $TiO_2$ | 15.0 |
| Layer 4 | $SiO_2/Al_2O_3$ | 47.0 |
| Layer 5 | ITO | 3.0 |
| Layer 6 | $TiO_2$ | 29.8 |
| Layer 7 | $SiO_2/Al_2O_3$ | 114.0 |
| Layer 8 | Top Coat (CC) = Super Hydrophobic Coating | 5.0 |

This spectacle lens 700 provides a spectral transmittance as shown in FIG. 4, curve d). The spectral transmittances of a spectacle lens made of the same substrate material MR-8 but being covered by coatings of the type shown in Table 3 on both sides is shown in FIG. 4, curve b) for comparison purposes also. Further properties of the spectacle lens 700 are: The antireflection coatings (720, 730) provide a purple residual reflection color at an angle of incidence of 0°, a luminous reflection of the blue filter coating of less than 0.75%, a luminous transmittance of more than 97% and a yellowness index of less than 10 as well as the above indicated high scratch and abrasion resistance indicated by a Bayer ratio of more than 10.

Figure 8:
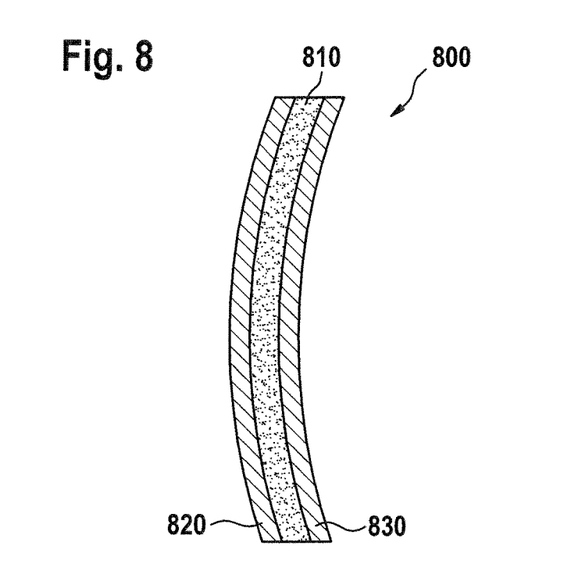
FIG. 8 shows the cross section of a third embodiment of a spectacle lens according to the invention providing a spectral transmittance very close to that shown in FIG. 4 (curve d)); and, FIG. 9 shows a flow chart of the process steps of a method according to the invention.

FIG. 8 shows the cross section of a third embodiment of a spectacle lens 800 according to the invention. The spectacle lens 800 shown in a partial section, which is not true to scale, in FIG. 8 has a substrate 810 made of plastic, for example the plastic polycarbonate. Both sides of the substrate 810 are covered with antireflection coatings (820, 830).

The substrate 810 does not consist of pure polycarbonate, only, but incorporates two dyes of the company LANXESS Deutschland GmbH being located in Leverkusen, Germany. One of the dyes is sold under the trade name MACROLEX Giallo 6G GRAN (as indicated in the SCHEDA DATI DI SICUREZZA No. 06653898/2.04, Data di edizione: Sep. 1, 2015), the other one of the dyes is sold under the trade name MACROLEX GIALLO 3G GRAN (as indicated in the SCHEDA DATI DI SICUREZZA No. 56378921/2.03, Data di edizione: Nov. 29, 2011). The latter one contains according to the data sheet pyrazolono-colorante-preparato contiene C.I. Solvent Yellow 93. The first one contains according to the data sheet colorante di metino Miscela contiene C.I. Disperse Yellow 201.

In order to produce the substrate 810 an amount of 0.0606 g per one kg polycarbonate pellets of the MACROLEX Giallo 6G GRAN dye and 0.0029 g per one kg polycarbonate pellets of the MACROLEX GIALLO 3G GRAN dye is required. This is calculated by means of a calculation engine provided by called "Plastic Colour Master" made by X-Rite. Details may be found under http://color.xrite.com/de-de/color-measurement-quote?utm_source=g oogle&utm_medium=cpc&utm_campaign=01-GO-DE-DE-Brand_P&utm_content=Brand&utm_term=x+rite.

The substrate 810 is fabricated by first mixing the dyes in the corresponding amount. In a second step mechanically mixing/stirring the mixed dyes and the polycarbonate pellets. In a third step the whole material is extruded and then in a fourth step injection molded in order to form a spectacle lens.

Both sides of the dyed substrate 810 are then covered by the same type of coatings having the layer sequence shown in Table 4.

TABLE 4

Antireflection coating (820, 830) applied to the front side and the back side of the substrate 810 of invented spectacle lens 800 shown in FIG. 8

|  | Coating Structure | Thickness (nm) |
| --- | --- | --- |
| Substrate | polycarbonate | |
| Hard Coat | Low Index Hard Resin | 3000 |
| Pre-etching | — | |
| Adhesion | Cr/SiO | 0.6 |
| Layer 1 | $ZrO_2$ | 24.7 |
| Layer 2 | $SiO_2$ | 19.6 |
| Layer 3 | $ZrO_2$ | 23.2 |
| Layer 4 | ITO | 4.0 |
| Layer 5 | $TiO_x$ | 95.4 |
| Layer 6 | $ZrO_2$ | 12.2 |
| Layer 7 | $SiO_2$ | 84.1 |
| Layer 8 | Top Coat (CC) = Super Hydrophobic Coating | 5.0 |

The spectacle lens 800 has light transmittance properties which are nearly identical to the spectacle lens 700, that is, the spectral transmittance at normal incidence onto the front surface is nearly identical with curve d) shown in FIG. 4. However, there is the advantage that the lens 800 does not provide significant residual reflecting properties in the blue wavelength range of the blue peak of the typical "cool white" automobile LED headlight and therefore avoids glare caused by LED headlights of cars following the wearer's car from behind and illuminating onto the back surface of the spectacle lens of the wearer and being otherwise reflected directly into the wearer's eye.

It is understood that the foregoing description is that of the preferred embodiments of the invention and that various changes and modifications may be made thereto without departing from the spirit and scope of the invention as defined in the appended claims.

What is claimed is:

1. A spectacle lens for an eye of a wearer, the spectacle lens comprising:
    a substrate made from mineral glass or an organic material;
    the spectacle lens defining a front surface configured to be fitted away from the eye and a back surface configured to be fitted nearer to the eye;
    the spectacle lens having selective light wavelength filter properties including:
        a spectral transmittance (T) between 80% and 95% for all wavelengths ($\lambda$) in a wavelength range between 428 nm and 452 nm for a light ray entering the spectacle lens on said front surface at an angle of incidence of 0°;
        a spectral transmittance (T) between 95% and 100% for all wavelengths ($\lambda$) in a wavelength range between 500 nm and 700 nm for a light ray entering the spectacle lens on said front surface at an angle of incidence of 0°; and,
    a yellowness index (YI E313) per ASTM Method E313 of no more than 10 for a standard illuminant D65 and a standard observer function of 2° (D65/2°).

2. The spectacle lens of claim 1, wherein:
    said selective light wavelength filter properties include at least one of:
        a spectral transmittance (T) between 80% and 90% for all wavelengths ($\lambda$) in a wavelength range between 428 nm and 452 nm for a light ray entering said spectacle lens on the front surface at an angle of incidence of 0°, and,
        a spectral transmittance (T) between 80% and 88% for all wavelengths ($\lambda$) in a wavelength range between 432 nm and 448 nm for a light ray entering said spectacle lens on the front surface at an angle of incidence of 0°.

3. The spectacle lens according to claim 1, wherein:
    said selective light wavelength filter properties include at least one of:
        a spectral transmittance (T) between 97% and 100% for all wavelengths ($\lambda$) in a wavelength range between 500 nm and 700 nm for a light ray entering said spectacle lens on the front surface at an angle of incidence of 0°; and,
        a spectral transmittance (T) between 97.8% and 100% for all wavelengths ($\lambda$) in a wavelength range between 500 nm and 700 nm for a light ray entering said spectacle lens on the front surface at an angle of incidence of 0°.

4. The spectacle lens of claim 1, wherein said selective light wavelength filter properties include a yellowness index (YI E313) per ASTM Method E313 of no more than 8 for a standard illuminant D65 and a standard observer function of 2° (D65/2°).

5. The spectacle lens of claim 1, wherein said selective light wavelength filter properties include a yellowness index (YI E313) per ASTM Method E313 of no more than 7 for a standard illuminant D65 and a standard observer function of 2° (D65/2°).

6. The spectacle lens of claim 1, wherein said substrate includes at least one of a dye, a pigment, and a tint absorbing light of all wavelengths ($\lambda$) in said wavelength range between 428 nm and 452 nm.

7. The spectacle lens of claim 1, wherein said substrate includes at least one of a dye, a pigment, and a tint absorbing light of all wavelengths ($\lambda$) in a wavelength range between 432 nm and 448 nm.

8. The spectacle lens of claim 6, wherein said substrate incorporates said at least one of said dye, said pigment, and said tint and is covered by said at least one of said dye, said pigment, and said tint.

9. The spectacle lens of claim 6, wherein said at least one of a dye, said pigment, and said tint absorbs between 5% and 20% of said light entering the spectacle lens on said front surface with said angle of incidence of 0° of all wavelengths (λ) in said wavelength range between 428 nm and 452 nm.

10. The spectacle lens of claim 6, wherein said at least one of said dye, said pigment, and said tint absorb between 10% and 20% of said light entering said spectacle lens on said front surface with said angle of incidence of 0° of all wavelengths (λ) in said wavelength range between 428 nm and 452 nm.

11. The spectacle lens of claim 1, wherein said substrate carries at least one of
a first dielectric stack configured to reflect light of all wavelengths (λ) in said wavelength range between 428 nm and 452 nm,
a second dielectric stack configured to reflect light of all wavelengths (λ) in a wavelength range between 432 nm and 448 nm,
a first multilayer dielectric coating configured to reflect light of all wavelengths (λ) in said wavelength range between 428 nm and 452 nm, and,
a second multilayer dielectric coating configured to reflect light of all wavelengths (λ) in a wavelength range between 432 nm and 448 nm.

12. The spectacle lens of claim 11, wherein
said first dielectric stack is configured to reflect between 5% and 20% of said light entering the spectacle lens on said front surface with said angle of incidence of 0° of all wavelengths (λ) in said wavelength range between 428 nm and 452 nm, or
said second dielectric stack is configured to reflect between 5% and 20% of said light entering the spectacle lens on said front surface with said angle of incidence of 0° of all wavelengths (λ) in a wavelength range between 432 nm and 448 nm, or
said first dielectric stack is configured to reflect between 10% and 20% of said light entering the spectacle lens on said front surface with said angle of incidence of 0° of all wavelengths (λ) in said wavelength range between 428 nm and 452 nm, or
said second dielectric stack is configured to reflect between 10% and 20% of said light entering the spectacle lens on said front surface with said angle of incidence of 0° of all wavelengths (λ) in a wavelength range between 432 nm and 448 nm or said first multilayer dielectric coating is configured to reflect between 5% and 20% of said light entering the spectacle lens on said front surface with said angle of incidence of 0° of all wavelengths (λ) in said wavelength range between 428 nm and 452 nm, or
said second multilayer dielectric coating is configured to reflect between 5% and 20% of said light entering the spectacle lens on said front surface with said angle of incidence of 0° of all wavelengths (λ) in said wavelength range between 432 nm and 448 nm, or
said first multilayer dielectric coating is configured to reflect between 10% and 20% of said light entering the spectacle lens on said front surface with said angle of incidence of 0° of all wavelengths (λ) in said wavelength range between 428 nm and 452 nm, or
said second multilayer dielectric coating is configured to reflect between 10% and 20% of said light entering the spectacle lens on said front surface with said angle of incidence of 0° of all wavelengths (λ) in said wavelength range between 432 nm and 448 nm.

13. The spectacle lens of claim 12, wherein:
said substrate defines a front side configured to be fitted away from the eye of the wearer; and,
said at least one of said first dielectric stack, said second dielectric stack, said first multilayer dielectric coating and said second dielectric coating is applied to only said front side of said substrate.

14. The spectacle lens of claim 11, wherein at least one of said first dielectric stack, said second dielectric stack, said first multilayer dielectric coating and said second multilayer dielectric coating have a photopic luminous reflection less than 0.75%.

15. The spectacle lens of claim 1, wherein said selective light wavelength filter properties include an overall transmittance of more than 97% in the wavelength range between 400 nm and 800 nm for a light ray entering the spectacle lens on said front surface at an angle of incidence of 0°.

16. The spectacle lens of claim 1, wherein the spectacle lens is for car drivers.

17. A method for determining selective light wavelength filter properties when making a spectacle lens, wherein said spectacle lens has a front surface intended to be fitted away from the eye and a back surface intended to be fitted nearer to the eye, said spectacle lens includes a substrate made from mineral glass or an organic material and said spectacle lens has selective light wavelength filter properties, the method comprising:
providing a spectral irradiance of an automobile headlight;
determining an irradiance for at least one wavelength (λ) in a wavelength range between 428 nm and 452 nm;
determining an irradiance for at least one wavelength (λ) in a wavelength range between 500 nm and 650 nm;
determining a ratio between said determined irradiance for said at least one wavelength (λ) in said wavelength range between 428 nm and 452 nm and said determined irradiance for said at least one wavelength (λ) in said wavelength range between 500 nm and 650 nm and/or determining a ratio between said determined irradiance for said at least one wavelength (λ) in said wavelength range between 500 nm and 650 nm and said determined irradiance for said at least one wavelength (λ) in said wavelength range between 428 nm and 452 nm;
defining an amount of attenuating spectral transmittance (T) for at least one wavelength (λ) in said wavelength range between 428 nm and 452 nm for a light ray entering said spectacle lens on said front surface at an angle of incidence of 0° if said determined ratio between said determined irradiance for said at least one wavelength (λ) in said wavelength range between 428 nm and 452 nm and said determined irradiance for said at least one wavelength (λ) in said wavelength range between 500 nm and 650 nm exceeds or equals a predetermined threshold value or defining an amount of attenuating spectral transmittance (T) for at least one wavelength (λ) in said wavelength range between 428 nm and 452 nm for a light ray entering said spectacle lens on said front surface at an angle of incidence of 0° if said determined ratio between said determined irradiance for said at least one wavelength (λ) in said wavelength range between 500 nm and 650 nm and said determined irradiance for said at least one wavelength (λ) in said wavelength range between 428 nm and 452 nm is below or equals a predetermined threshold value; and at least one of:
- determining a spectral transmittance (T) between 95% and 100% for all wavelengths (λ) in a wavelength range between 500 nm and 700 nm for a light ray entering the spectacle lens on said front surface at an angle of incidence of 0°;
- determining a yellowness index (YI E313) per ASTM Method E313 of no more than 10 for a standard illuminant D65 and a standard observer function of 2° (D65/2°); and,
- determining an overall transmittance of more than 97% in a wavelength range between 400 nm and 800 nm for a light ray entering the spectacle lens on said front surface at an angle of incidence of 0°.

18. The method of claim 17, further comprising:
fabricating said spectacle lens according to said selective light wavelength filter properties being determined.

19. The method of claim 17, wherein the spectacle lens is for car drivers.

20. A spectacle lens for an eye of a wearer, the spectacle lens comprising:
- a substrate made from mineral glass or an organic material;
- the spectacle lens defining a front surface configured to be fitted away from the eye and a back surface configured to be fitted nearer to the eye;
- the spectacle lens having selective light wavelength filter properties including:
  - a spectral transmittance (T) between 80% and 95% for all wavelengths (λ) in a wavelength range between 428 nm and 452 nm for a light ray entering the spectacle lens on said front surface at an angle of incidence of 0°;
  - a spectral transmittance (T) between 95% and 100% for all wavelengths (λ) in a wavelength range between 500 nm and 700 nm for a light ray entering the spectacle lens on said front surface at an angle of incidence of 0°; and,
  - a yellowness index (YI E313) per ASTM Method E313 of no more than 10 for a standard illuminant D65 and a standard observer function of 2° (D65/2°),
- wherein said substrate includes at least one of a dye, a pigment, and a tint absorbing between 5% and 20% of light of all wavelengths (λ) in said wavelength range between 428 nm and 452 nm.

* * * * *